US006603115B1

(12) United States Patent
Gordon-Ingram

(10) Patent No.: US 6,603,115 B1
(45) Date of Patent: Aug. 5, 2003

(54) MEASUREMENT SCALE AND SYSTEM INCORPORATING A MEASUREMENT SCALE FOR DETERMINING ABSOLUTE POSITION

(75) Inventor: Iain R Gordon-Ingram, Chippenham (GB)

(73) Assignee: Renishaw PLC, Gloucestershire (GB)

( * ) Notice: Subject to any disclaimer, the term of this patent is extended or adjusted under 35 U.S.C. 154(b) by 47 days.

(21) Appl. No.: 09/705,952

(22) Filed: Nov. 6, 2000

(30) Foreign Application Priority Data

Nov. 11, 1999 (GB) .............................................. 9926574

(51) Int. Cl.[7] ................................................ G01D 5/34
(52) U.S. Cl. .......................... 250/231.14; 250/231.18; 341/31
(58) Field of Search ........................ 250/231.14, 231.18; 341/13, 31, 1, 15; 356/616, 620, 15, 17; 324/207.17

(56) References Cited

U.S. PATENT DOCUMENTS

| | | | |
|---|---|---|---|
| 4,587,513 A | * | 5/1986 | Burrowes et al. ...... 250/231.13 |
| 4,776,211 A | * | 10/1988 | Griswold, Jr. ............... 33/521 |
| 4,814,626 A | | 3/1989 | Doemens et al. |
| 5,204,524 A | | 4/1993 | Ichikawa et al. |
| 5,341,211 A | * | 8/1994 | Prinzhausen et al. ... 250/237 G |
| 5,502,568 A | * | 3/1996 | Ogawa et al. ........... 250/222.1 |
| 5,671,052 A | * | 9/1997 | Kawakubo et al. ......... 356/616 |
| 5,841,538 A | * | 11/1998 | Schoeffler et al. .......... 340/583 |

FOREIGN PATENT DOCUMENTS

| | | |
|---|---|---|
| DE | 197 32 398 A1 | 2/1999 |
| EP | 0 575663 A1 | 12/1993 |
| EP | 1 010 967 A2 | 6/2000 |
| WO | WO 98/13669 | 4/1998 |

* cited by examiner

Primary Examiner—Stephone B. Allen
(74) Attorney, Agent, or Firm—Oliff & Berridge, PLC

(57) ABSTRACT

A scale and scale reader are disclosed which may be used to determine absolute position of the reader with respect to the scale in two directions. In an embodiment of the invention a chequered pattern is produced on a scale and block of the pattern may be imaged on a detector and decoded. The blocks contain bits of information which define an absolute position. The pattern may be used also for incremental measurement.

16 Claims, 2 Drawing Sheets

8

MEASUREMENT SCALE AND SYSTEM INCORPORATING A MEASUREMENT SCALE FOR DETERMINING ABSOLUTE POSITION

BACKGROUND OF THE INVENTION

1. Field of the Invention

The present invention relates to the measurement of the absolute position of an object.

2. Description of the Prior Art

A single-axis incremental position encoder is a device for measuring the relative movement of two objects along one axis. Typically, a scale is attached to one of the objects and a read head to the other, the scale having regularly spaced identical markings on it. The read head contains a light source which illuminates the scale and a sensor or sensors for detecting the scale markings. In the simplest case, the read head provides outputs which allow the markings to be counted to keep track of position. Usually, the read head provides some electronic interpolation such that the effective resolution is higher than would be achieved by direct counting of the markings on the scale. In some cases, the outputs are analogue (often two sinusoidal in quadrature) to allow electronics external to the read head to perform the interpolation. As such, an incremental encoder has no knowledge of the read head's position along the scale. However, a reference mark may be provided on or alongside the scale for this purpose. A sensor in the read head can detect the reference mark and this defines a datum position.

Dual-axis incremental position encoders also exist. In the simplest case, these include two read heads mounted together at right angles to each other, and a scale with periodicity in two usually orthogonal directions, each read head measuring incremental movement in a respective one of the two directions. In other cases, the two read heads are combined together e.g. as shown in U.S. Pat. No. 5,204,524. Dual axis incremental encoders work in a similar way as their single-axis counterparts, but typically produce two separate sets of outputs corresponding to the two axes of movement.

The read head of a single axis absolute encoder typically runs up and down a scale with data written on it, often as binary bits. By reading these bits, either with one detector as the read head passes over the scale, or simultaneously with several detectors, the read head can determine its absolute position. This position is typically relayed from the read head to a control system by means of a serial interface.

Hybrid incremental-absolute single-axis position encoders also exist e.g. European Patent No. 1010967. As it is possible to make incremental encoders with finer resolution than absolute encoders, many absolute encoders also incorporate an incremental channel. The absolute channel gives absolute position accurate to one period of the incremental channel, and interpolation of the incremental channel gives absolute position within the period of the incremental channel to the desired fine resolution. Combined together, the two systems work side by side to give absolute position to the fine resolution.

A "single-axis" encoder may read linear position with a straight scale, angular position, using a curved scale, or position along any other straight or curved line. A "dual-axis" encoder may read position in each of two usually orthogonal directions in a plane, position on the surface of a cylinder, or position on any other curved or flat surface.

There are at least two drawbacks with incremental encoders:

When an incremental encoder is powered up, there is no way of knowing the position of its read head. The read head has to be moved relative to the scale to find the reference position(s). In some applications (e.g. linear motors) it is not possible to move the read head until absolute position is known.

In the event of power failure, or if the read head temporarily loses the ability to read the scale, the read head's position becomes unknown. In some applications (e.g. printed circuit board pick and place machines), subsequent attempts to find the datum position may cause damage to the work or machine.

In situations where two axes of movement must be measured, one solution to these problems would be to use two single axis absolute encoders. However, in many applications this is not possible. Another drawback is that Abbe errors result from the necessary distance between the read heads and the point at which the measurement is required. In some cases, a more compact solution is required anyway.

SUMMARY OF THE INVENTION

According to a first aspect the invention provides a measurement scale comprising readable bits having generally constant pitch extending in at least one direction, for enabling incremental measurement, and at least one sub-set of the bits which define an absolute position in the said at least one direction.

The boundary of the or each sub-set may be defined, by symbols.

The bits may be formed as a matrix of areas extending in two directions, each area defining a bit and the at least one sub-set may be a block of such areas for defining the absolute position in at least one of the said two directions.

Preferably the areas form a generally chequered pattern and the areas of the at least one sub-set are distinguishable from the general pattern by means of a variance in the optical properties of one or more of the areas of the sub-set.

The two directions mentioned may be two orthogonal directions.

According to a second aspect the invention provides a measurement scale comprising readable bits having generally constant pitch extending in two directions, for enabling measurement and at least one sub-set of the bits which define an absolute position in the said two directions.

The invention provides also, according to a third aspect a system for measuring absolute position in two directions comprising a scale according to one of the aspects above and a scale reader for reading the sub-set in order to determine the absolute position.

The scale reader may be an optical reader having an optical detector adapted to read the scale optically. Preferably the detector is an array of photodetectors.

Preferably the reader includes a microlens array for focusing an image of the bits of the scale onto the detector, and the system includes a scale illuminator, adapted to provide a short burst of light to provide a substantially instantaneous image for the reader, during relative movement between the scale and the scale reader. The reader may be adapted to read at least one whole sub-set of bits during the relative movement.

According to a fourth aspect the invention provides a system for measuring absolute position in two directions comprising a scale and a scale reader relatively movable in the two directions with respect to the scale, the scale being provided with a matrix of bits in which different sub-sets of bits define different absolute positions in each of the two directions and the scale reader being adapted to read the bits for deriving, from the read sub-set, the absolute position of the reader on the scale in the two directions.

Preferably the matrix of bits enables incremental measurement to take place.

According to a fifth aspect the invention provides a method for measuring absolute position on a scale comprising the steps of:

providing a scale comprising a matrix of bits and sub-sets of the bits formed as words;

providing a scale reader having a scale image detector;

forming an image of at least one whole word at the detector;

capturing the image; and, decoding the image to obtain an absolute position defined by the word.

BRIEF DESCRIPTION OF THE DRAWINGS

The present invention will now be described, by way of example, with reference to the accompanying drawings, in which.

DESCRIPTION OF PREFERRED EMBODIMENTS

Figures 1, 2:
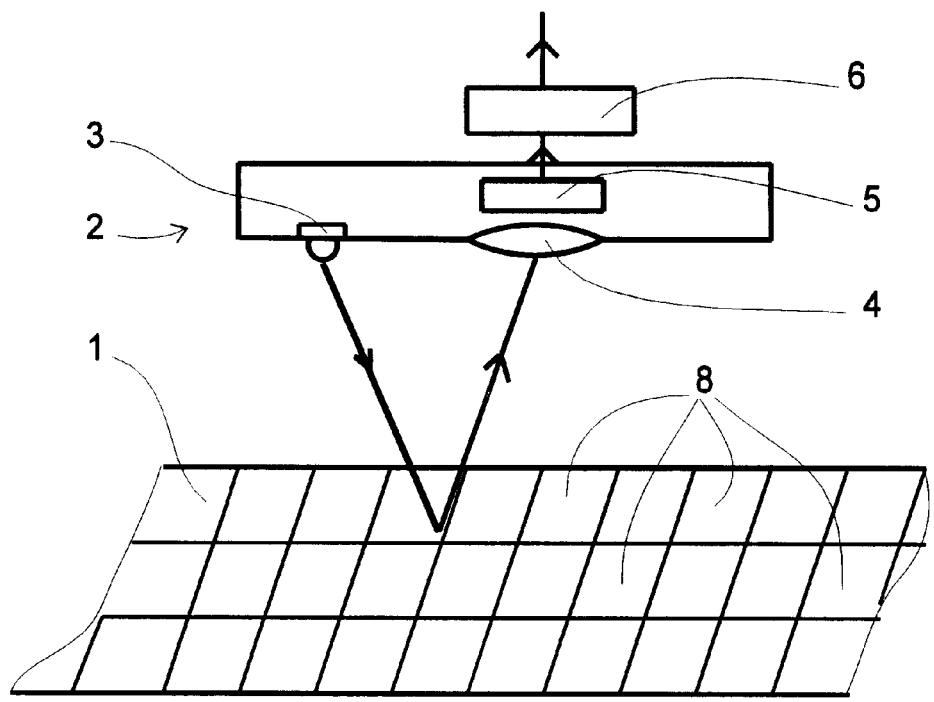
FIG. 1 shows an example of how bits for a particular sub-set may be provided on a scale.
FIG. 2 is a schematic diagram of an example of a system according to the invention.

In the following example of an encoder a plate (hereinafter called "the scale") is provided, the surface of which is divided up into a matrix of square areas, or "cells". Each cell contains one bit of information. (The bits may be binary or multi-level, or represent an analogue level). The bits are capable of being read by electronic reading apparatus (hereinafter called "the read head"). The bits may be read optically, magnetically, capacitively, inductively or by any other means.

Referring to the drawings, the bits are arranged in blocks or sub-sets, and each of these blocks form a word 8. Many blocks are provided on the scale 1 to form the matrix.

In the case of a hybrid encoder, the values of the bits on the scale are arranged such that the scale has sufficient periodicity in two directions that the scale can also be read by an incremental detector.

The values of the bits on the scale are arranged such that by reading some sub-set of all the bits on the scale, the absolute position of the read head can be determined in two directions (orthogonal directions in the present example). There are several ways in which the read head could read the scale. An optical method is present here.

In this example, the scale is a flat sheet of glass with chrome deposited on it. The bits are binary and a "1" is represented by a cell filled with chrome and a "0" is represented by an empty cell. Hence when illuminated, a "1" cell reflects more light than a "0" cell. The read head consists of a device to illuminate the scale, a lens (or lenses) to image the scale on to the detector and a charge-coupled detector (CCD) to enable several bits to be detected simultaneously. For simplicity, let the lens form a life-size image of the scale and let each bit on the scale be imaged on to one pixel on the CCD. (In practice each bit on the scale may be imaged to more than one CCD pixel to allow for misalignment). The readout of the CCD can then be decoded (or checked against a lookup table) to reveal the absolute position of the read head.

One method of decoding position from the CCD readout will be described. The bits on the scale are arranged in rectangular blocks of bits, at least one row long and one column wide. The bits are binary in this example. Each block represents one "word" of data. The CCD is large enough to ensure that at least one word is imaged on to it at any one time. The word is separated from the surrounding words by means of start and/or stop symbols which form block boundaries. For example, all words might be 7 bits long and 7 bits wide, but use the first two rows and first two columns to identify the start of a new word (see FIG. 1). The "1" and "0" bits are the same for each word and "X" represents a data bit and may be "1" or "0" and differs between different data words. The data bits contain the absolute position information.

One possible decoding procedure is as follows.

An "image" is grabbed from the CCD and is fed into a decoding system. This system searches the image for a complete word. It does this by looking for the characteristic pattern of "1" and "0" bits shown in FIG. 1 that define the top left corner of a word. Note that this pattern cannot occur except at the top left corner of a word. Two things are now known. The first is the position of the word on the CCD and the second is the contents of the data bits in that word. The data bits contain sufficient information to identify the word uniquely. If the sequence in which the words are written on the scale is known, the encoder can then tell how far it is along both axes from one corner of the scale. The position of the word on the CCD locates the encoder to the nearest bit (in both directions).

FIG. 2 is a schematic representation of an encoder according to the above, in which reference numeral 1 designates a scale and reference numeral 2 designates a read head, in which there are a light source 3 (for example a light-emissive diode) for illuminating the scale 1, and a lens arrangement 4 (which may be a microlens array) for focussing an image of bits on to a CCD 5 (which may be any array of photodetectors), reference numeral 6 designating electronics for decoding the image on the CCD 5.

Figure 3:
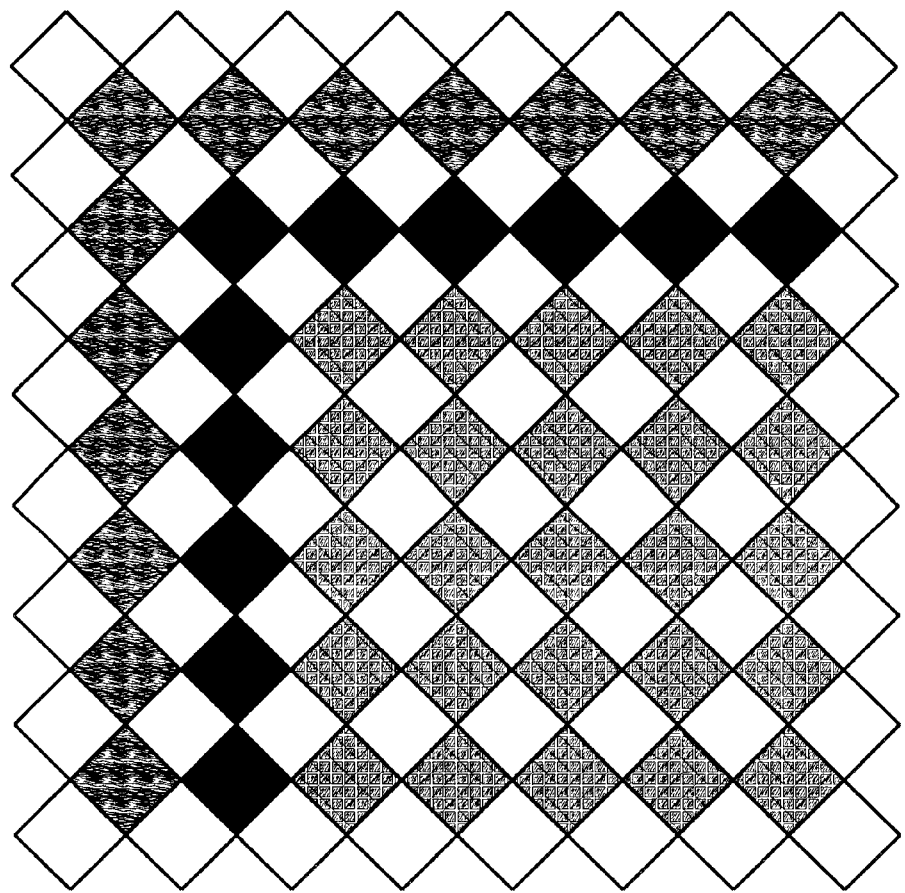
FIG. 3 shows another example of how bits of a particular sub-set may be provided on a scale.
Figure 3:
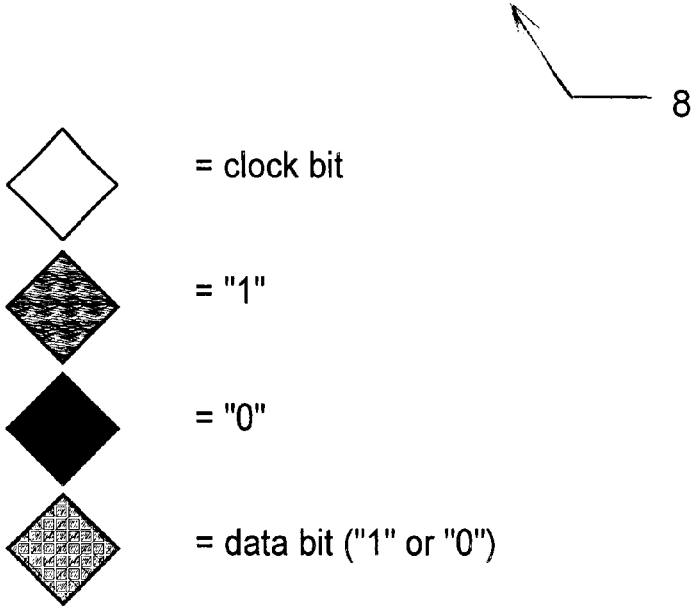

For a hybrid incremental-absolute encoder, it is necessary to write the bit pattern on to the scale such that there is sufficient periodicity for an incremental detector to be able to pick off the regularly spaced "clock frequency" that defines the incremental period. One method of doing this is presented here:

The scale plate is designed as in FIG. 3 which shows the area of scale corresponding to one word of data. If the scale again is a glass plate with chrome deposited on it, this pattern could be written as follows:

Leave clear glass for the clock bits.

Write half-density chrome for "0" bits.

Write full-density chrome for "1" bits.

The absolute position can be read out in the same way as before, but clearly every other pixel must be left out of the processing. The incremental "clock frequency" is always present. Its amplitude varies with position on the scale, but this may be compensated for. Therefore, an incremental detector can be used to measure position within one period of the incremental pattern. Usually, the read head will be required to read out absolute position to some defined resolution (the "system resolution") which may be finer than one period of the incremental pattern.

Since the absolute position can be determined to the nearest CCD pixel and there is at least one CCD pixel per scale bit, the absolute position is known to better than one period of the incremental pattern. Assuming that noise levels are low enough, the incremental detector can be used to give position within one period of the incremental scale pattern to "system resolution". Taken together, the two can be used to give absolute position throughout the extent of the scale to system resolution.

A direct-imaging (image transfer) microlens array may be used to image the scale onto the CCD. This would reduce the overall height of the optical system and improve the read head-scale spacing tolerance.

Several words of data may be imaged on to the CCD simultaneously. This would allow them to be checked for consistency and provide error-immunity. The data bits within one word may also contain some redundancy to allow error checking and/or correction.

The incremental channel most effectively reads lines of diamonds (at 45°). Pixels on CCDs tend to be square or rectangular, so although not essential there may be some benefit in having the axes of the CCD pixels parallel with sides of diamonds.

The illumination may be provided in short bursts to effectively freeze the image of the scale if it is moving when an image is grabbed from the CCD.

The scale could be a flat sheet (for axes which are, but need not be, orthogonal) or a curved surface. A curved surface may be "continuous" as in a cylinder (for angular direction and axial direction measurement), for example. The scale may be spherical.

Whilst a CCD has been described in the detailed description any array of photodetectors could be used e.g. an CMOS image sensor. Alternatively other bit detectors could be used e.g. of a capacitance or magnetic type.

What is claimed is:

1. A measurement scale comprising readable bits having generally constant pitch extending in at least one direction, the readable bits forming an incremental scale pattern which can be read to provide incremental measurement in said at least one direction, at least one sub-set of the bits defining an absolute position in said at least one direction.

2. A measurement scale as claimed in claim 1 wherein the boundary of the or each sub-set is defined by symbols.

3. A measurement scale as claimed in claim 1 wherein the bits are formed as a matrix of areas extending in two directions each area defining a bit, and the at least one sub-set is a block of such areas for defining the absolute position in at least one of the said two directions.

4. A measurement scale as claimed in claim 3 wherein the areas form a generally chequered pattern and the areas of the at least one sub-set are distinguishable from the general pattern by means of a variance in the optical properties of one or more of the areas of the sub-set.

5. A measurement scale as claimed in claim 4 wherein the two directions are two orthogonal directions.

6. A measurement scale comprising readable bits having generally constant pitch extending in two directions, the readable bits forming an incremental scale pattern which can be read to provide incremental measurement in the said two directions and at least one sub-set of the bits defining an absolute position in the said two directions.

7. A system for measuring absolute position in two directions comprising a scale including readable bits having generally constant pitch extending in two directions, the readable bits forming an incremental scale pattern which can be read to provide incremental measurement, and at least one sub-set of the bits which define an absolute position in the said two directions and a scale reader for reading the at least one sub-set in order to determine the absolute position.

8. A system for measuring absolute position in two directions as claimed in claim 7 wherein the scale reader is an optical reader having an optical detector adapted to read the scale optically.

9. A system for measuring absolute position in two directions as claimed in claim 8 wherein the detector is an array of photodetectors.

10. A system for measuring absolute position in two directions as claimed in claim 9 wherein the reader includes a microlens array for focusing an image of the bits of the scale onto the detector.

11. A system for measuring absolute position in two directions as claimed in claim 7 wherein the system includes a scale illuminator.

12. A system for measuring absolute position in two directions as claimed in claim 11 wherein the illuminator provides in use a short burst of light to provide a substantially instantaneous image for the reader, during relative movement between the scale and the scale reader.

13. A system for measuring absolute position in two directions as claimed in claim 7 wherein the reader in use provides an image of at least one sub-set of bits during the relative movement.

14. A system for measuring absolute position in two directions comprising a scale and a scale reader relatively movable in the two directions with respect to the scale, the scale being provided with a matrix of bits in which different sub-sets of bits each define different absolute positions in each of the two directions and the scale reader being capable of reading the bits for deriving, from the read sub-set, the absolute position of the reader on the scale in the two directions, and wherein the bits of the matrix form an incremental scale pattern which can be read to provide incremental measurement.

15. A method for measuring absolute position on a scale comprising the steps of:
   providing a scale comprising a matrix of bits and sub-sets of the bits formed as words, the bits forming an incremental scale pattern which can be read to provide incremental measurement;
   providing a scale reader having a scale image detector;
   forming an image of at least one whole word at the detector;
   capturing the image; and
   decoding the image to obtain an absolute position defined by the word.

16. A method for measuring absolute position in two directions on a scale comprising the steps of:
   providing a scale comprising a matrix of bits extending in each of the said two directions and sub-set of the bits formed as words, the bits forming an incremental scale pattern which can be read to provide incremental measurement;
   providing a scale reader having a scale image detector;
   forming an image of at least one whole word at the detector;
   capturing the image; and
   decoding the image to obtain an absolute position defined by the word.

* * * * *